United States Patent [19]
Winkler

[11] 3,864,705
[45] Feb. 4, 1975

[54] PHOTOGRAPHIC APPARATUS WITH EXPANSIBLE HOUSING

[75] Inventor: Alfred Winkler, Munich, Germany

[73] Assignee: AGFA-Gevaert Aktiengesellschaft, Leverkusen, Germany

[22] Filed: Mar. 23, 1973

[21] Appl. No.: 344,366

[30] Foreign Application Priority Data
Mar. 27, 1972 Germany............................ 2214955

[52] U.S. Cl..................... 354/187, 292/80, 354/212
[51] Int. Cl...................... G03b 17/04, G03b 19/04
[58] Field of Search............. 95/31 R, 11 R, 32, 34, 95/39, 55, 31 FL, 31 FM, 31 AC; 292/80, 86-89, 341.15; 354/187, 212

[56] References Cited
UNITED STATES PATENTS

| | | | |
|---|---|---|---|
| 2,126,312 | 8/1938 | Crumrine | 95/32 |
| 2,169,548 | 8/1939 | Zapp | 95/55 X |
| 2,327,797 | 8/1943 | Hutchison | 95/32 |
| 2,358,321 | 9/1944 | Fassin | 95/32 |
| 3,096,699 | 7/1963 | Harvey et al. | 95/31 R |
| 3,153,375 | 10/1964 | Zapp | 95/31 R |
| 3,680,455 | 8/1972 | Meinunger | 95/39 UX |
| 3,750,549 | 8/1973 | Waaske | 95/11 R |

Primary Examiner—Samuel S. Matthews
Assistant Examiner—Kenneth C. Hutchison
Attorney, Agent, or Firm—Michael S. Striker

[57] ABSTRACT

A still camera wherein the main section or body of the housing guides a reciprocable cover member of the housing. The cover member is movable between an extended position and a concealing position and is permanently biased to the extended position by a helical spring. When moved by hand to the concealing position, the cover member overlies the view finder and the picture taking lens in the body and can also block the actuation of camera release. The cover member can be locked in such concealing position by a detent mechanism which includes a tooth on the cover member and a complementary tooth which is mounted in the body and can be moved by a knob into or from engagement with the tooth of the cover member. The latter can transport the film, cock the shutter, advance the exposure counter and/or perform other functions during movement from extended to concealing position or vice versa.

14 Claims, 8 Drawing Figures

PHOTOGRAPHIC APPARATUS WITH EXPANSIBLE HOUSING

BACKGROUND OF THE INVENTION

The present invention relates to photographic apparatus in general, especially to still cameras, and more particularly to improvements in pocket cameras of the type wherein the housing is expansible preparatory to the making of exposures and can be reduced in size prior to being stored in a pocket, purse or the like.

In certain presently known still cameras with expansible housing a portion which contains the view finder is movable between a concealed position in which it is confined in the housing proper and an extended position in which the view finder is ready for use. It is also known to provide a still camera with an insert which is reciprocable relative to the housing between a concealed and an exposed position and serves to cock the shutter, to advance the film to count exposures and or to prevent double exposures. In each instance, the reciprocable portion or insert must be pulled to the extended position and pushed to the concealed position. This renders it necessary to move the camera away from a shooting position in front of the user's eye and to return it to such position upon completed cocking of the shutter and/or upon completed transport of the film. Therefore, such cameras are not suited for the making of exposures in rapid succession, for example, for taking pictures of shy animals or of rapidly moving objects. Moreover, the extraction of reciprocable portion or insert from the housing is often difficult, especially if the user manipulates the camera with gloves and/or when the camera is a so-called subminiature camera.

SUMMARY OF THE INVENTION

An object of the invention is to provide a photographic apparatus, especially a pocket camera, with a novel and improved housing which can be reduced in size when ready to be placed in storage and which can be expanded or enlarged so as to be manipulated with greater ease during the making of exposures.

Another object of the invention is to provide a still camera which can be reduced in size so as to be conveniently stored in a pocket or purse but can make exposures, even with relatively long exposure times, without camera shake.

A further object of the invention is to provide a still camera wherein the sensitive parts, particularly the optical elements, can be concealed before the camera is put into storage without resorting to a separate case and wherein that part which enables the user to increase the overall size of the camera prior to the making of exposures can also perform one or more additional useful functions, such as cocking of the shutter, transporting the film, actuating the exposure counter, preventing double exposures and/or others.

An additional object of the invention is to provide a still camera with novel and improved means for protecting the picture taking lens and/or the view finder without resorting to a customary carrying case.

The improved photographic apparatus comprises a housing including a first section which is provided with guide means for a second section of the housing. The second section is reciprocable between first and second positions in which one of the sections (preferably the second section) respectively conceals and exposes a portion of the other section, and the camera further comprises resilient means which reacts against the first section and biases the second section to the second position. The other section can support the picture taking lens and/or the lenses of the view finder so that such lenses are concealed in the first position of the second section. The latter can actuate the film transporting mechanism, cock the shutter and/or advance the exposure counter during movement from the first to the second position or vice versa, preferably during movement to the first position.

It is desirable to provide the camera with a detent mechanism which can lock the second section in its first position to thus protect the lenses when the camera is stored in a pocket or purse. The detent mechanism may comprise a first tooth on the second section and a second tooth in the first section. One of these teeth can be moved from an inoperative position to an operative position to thereby cause the second tooth to engage the first tooth in the first position of the second section whereby the second position is held in first position against the action of the resilient means.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
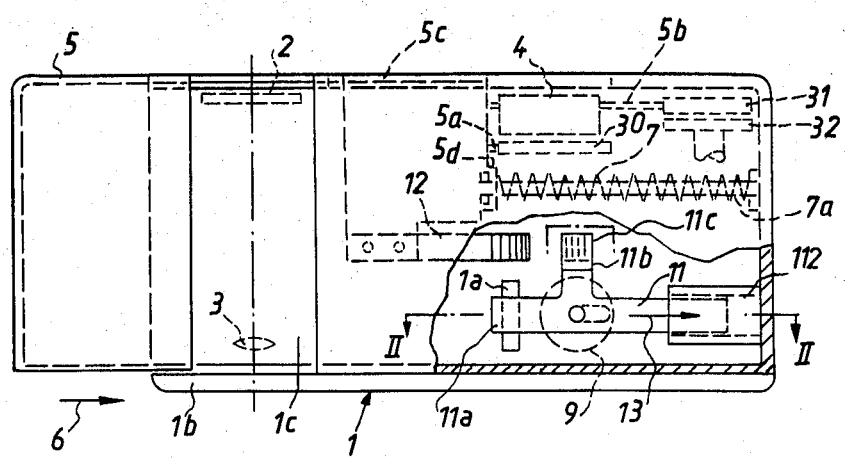
FIG. 1 is a partly elevational and partly sectional view of a still camera which embodies one form of the invention and wherein the reciprocable second section is shown in its second or extended position.

Referring first to FIG. 1, there is shown a still camera having a composite housing comprising a first section or body 1 which includes guide means 1b for a reciprocable cover member or case 5 constituting a second section of the housing. The second section or cover member 5 is movable by hand between a first position in which it conceals a portion 1c of the first section or body 1 and the illustrated second or extended position. The portion 1c of the body 1 contains a view finder including the front and rear optical elements 2 and 3. A picture taking lens 4 is mounted in the body 1 to the right of the view finder, as viewed in FIG. 1, and the cover member 5 includes a portion 5c which overlies and conceals the lens 4 when the cover member is pushed to its first position by moving in the direction indicated by an arrow 6. It is clear that, when shifted in the direction indicated by the arrow 6, the cover member 5 can conceal additional camera parts which are connected in or on the portion 1c of the body 1. The camera is ready for use when the cover member 5 assumes the illustrated extended or second position in which it exposes the view finder including the optical elements 2 and 3 as well as the picture taking lens 4.

The cover member 5 further comprises a portion 5a which serves to cock a shutter 30 behind the picture taking lens 4 when the cover member 5 is moved in or counter to the direction indicated by the arrow 6. All that counts is to mount the portion 5a of the cover member 5 in such a way that it can cock the shutter 30 not later than when the cover member reassumes the illustrated second position. The camera release which has to be activated in order to allow the shutter to leave its cocked position is not shown in the drawing. Still further, the cover member 5 comprises a portion 5b which can operate a film transporting mechanism here shown as including a wheel or gear 31 serving to rotate a takeup reel 32. The portions 5a and 5b of the cover member 5 may constitute toothed racks. The portion or rack 5a can mesh with a gear segment which automatically cocks the shutter 30 when the cover member 5 moves toward or away from its second position. Analogously, the portion or rack 5b can be in permanent mesh with the gear 31. The gear 31 is then connected with the takeup reel 32 through the intermediary of a one-way clutch (not shown) which rotates the reel 32 in a direction to collect the film only while the cover member 5 moves in or counter to the direction indicated by the arrow 6, preferably while the cover member moves towards its first position.

In accordance with a feature of the invention, the housing of the camera contains a resilient element 7, here shown as a helical spring, which reacts against the body 1 and serves to permanently urge the cover member 5 to the illustrated second position. As shown, the cover member 5 has a retainer 5d against which the leftmost convolution of the spring 7 abuts. This spring is guided by a rod 7a which is mounted in the interior of the body 1. It will be noted that the cover member 5 normally assumes its second position (shown in FIG. 1) under the action of the spring 7, and that it requires the application of a force in order to overcome the bias of the spring 7 so as to move the cover member 5 to the first position in which the cover member conceals the view finder and the picture taking lens 4.

When the user of the camera completes an exposure, the cover member 5 is moved in the direction indicated by the arrow 6 so as to stress the spring 7. During such movement, or during return movement to the illustrated second position under the action of the spring 7, the portions 5a and 5b of the cover member 5 respectively cock the shutter 30 and operate the film transporting mechanism including the gear 31 so that the film transporting mechanism places a fresh film frame into register with the lens 4 and the shutter 30 is cocked not later than when the cover member 5 reassumes the illustrated second position. The operator of the camera then actuates the release so as to make an exposure, whereupon the cover member 5 is again moved in the direction indicated by the arrow 6 to place the next unexposed film frame into register with the lens 4 and to again cock the shutter 30. The same procedure is repeated again and again until the last film frame is exposed or until the user decides to interrupt the making of exposures. The manner in which the film is to be inserted into and withdrawn from the body 1 of the camera housing forms no part of the present invention.

An important advantage of the reciprocable cover member 5 is that it automatically enlarges the overall dimensions of the housing when it is allowed to assume the illustrated second position under the action of the spring 7. This enables the user to safely hold the housing during the making of exposures to thereby reduce the likelihood of camera shake. Furthermore, in addition to contributing to an enlargement of the housing, the cover member 5 can protect or shield one or more sensitive parts when the camera is not in use, and the cover member 5 can further serve to automatically actuate or operate one or more camera assemblies including cocking of the aforementioned shutter 30 (provided that the camera is not provided with an automatic shutter), rotating the film transporting gear 31, actuating an exposure counter (not shown), indexing the socket for a flash lamp holder, actuating a striker for percussively firing flash lamps, and/or others. All such operations are preferably performed while the cover member moves toward its first position to stress the spring 7.

The cover member 5 can be pushed with the palm of one hand while the user holds the body 1 with the other hand so that the user need not remove the camera from in front of his or her eyes during cocking of the shutter 30 and during transport of film by the length of a frame. Thus, the cover member 5 need not be gripped in a given way prior to moving it in the direction indicated by the arrow 6; such movement of the cover member can be effected with a gloved hand.

The cover member 5 is preferably designed with a view to complement the body 1 of the camera housing, i.e., the housing should be large enough to allow for convenient holding and manipulation in the second position of the cover member and the housing should be compact enough for insertion into a pocket, purse or small carrying case when the cover member is held in its first position. In the illustrated second position, the cover member 5 complements the body 1 to constitute therewith a substantially box-shaped housing.

The improved camera is further provided with a detent mechanism which can lock the cover member 5 in the first position in which the cover member overlies the optical elements 2, 3 and 4. The detent mechanism is illustrated in the lower right-hand portion of FIG. 1 and in FIG. 2. The construction of this detent mechanism is such that, if the user wishes, the cover member 5 need not be locked in response to movement in the direction indicated by the arrow 6, i.e., the user can repeatedly cock the shutter 30 and repeatedly operate the film transporting mechanism without being compelled to actuate the detent mechanism.

Figure 2:
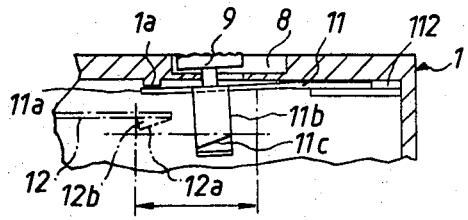
FIG. 2 is a sectional view as seen in the direction of arrows from the line II—II of FIG. 1.

As shown in FIG. 2, one wall of the body 1 is provided with a recess 8 for an actuating member or knob 9 which is shiftable in the recess 8 in a direction to the right or to the left, as viewed in FIG. 2. The knob 9 has a shank which is connected to a detent member 11 here shown as a leaf spring one end portion of which is reciprocably guided in a channel 112 of the body 1. The other end portion 11a of the leaf spring 11 can be moved into abutment with or can overlie (as shown in FIG. 2) an internal projection 1a of the housing or body 1. The leaf spring 11 further comprises an arm 11b having a projection or tooth 11c which can be moved to and from an operative position, namely, into or from the path of a tooth 12b provided on a resilient detent member or extension 12 of the cover member 5. The tooth 12b has an inclined face 12a which completely bypasses the tooth 11c of the arm 11 b when the leaf spring 11 assumes the inoperative position shown in FIG. 2. However, if the knob 9 is shifted in the direction indicated by the arrow 13 so that the end portion 11a of the leaf spring 11 slides off the projection 1a in the body 1, the innate resiliency of spring 11 causes the end portion 11a to move upwardly, as viewed in FIG. 2, so that the tooth 11c is moved into the path of movement of the inclined face 12a on the tooth 12b. Consequently, when the cover member 5 is again moved in the direction indicated by the arrow 6, the face 12a of the tooth 12b slides along the tooth 11c and the tooth 12b thereupon snaps behind the tooth 11c the arm 11b whereby the cover member 5 is held in its first position. When the cover member 5 is locked in the first position, the spring 7 stores energy. This spring can expand to automatically return the cover member 5 to the second position shown in FIG. 1 in response to depression of the knob 9 and subsequent movement of this knob toward the position indicated in FIG. 2. The end portion 11a of the leaf spring 11 then slides onto the projection 1a and automatically disengages the tooth 11c from the tooth 12b of the extension 12. The camera is then ready for use because the shutter 30 is cocked and the film has been transported by the length of a frame. If the user thereupon leaves the knob 9 in the position shown in FIG. 2, the leaf spring 11 maintains the tooth 11c away from the path of the tooth 12b on the extension 12 so that the user of the camera can move the cover member 5 in the direction indicated by the arrow 6 after each exposure.

An advantage of the detent mechanism of FIGS. 1 and 2 is that its parts need not extend beyond the outlines of the body 1 and cover 5. Thus, the knob 9 can be readily configurated in such a way that it does not extend from the recess 8 in both end positions of the leaf spring 11.

The user of the camera will lock the cover member 5 in the first position when the camera is to be stored, for example, in a pocket or purse. By moving the cover member 5 to its first position, the user greatly reduces the overall dimensions of the camera housing and simultaneously protects all sensitive elements against entry of dust, moisture or other foreign matter as well as against mechanical impacts. It is clear that the spring 7 can be replaced with other types of springs, for example, with one or more springs which pull rather than push the cover member 5 to its second position. Furthermore, in certain cameras, the cover member 5 can be constructed in such a way that it can conceal only the view finder or only the picture taking lens. Still further, the cover member 5 can be used to cock the shutter without operating the film transporting mechanism or to operate the film transporting mechanism without cocking the shutter, i.e., the portion 5a or 5b of the cover member can be omitted.

The cover member 5 preferably follows the outline of the portion 1c of the body 1 when it assumes the first position in which the optical elements 2, 3, 4 are concealed. In its second position, the cover member 5 complements the body 1 to impart to the housing a predetermined outline such as is best suited for convenient manipulation of the camera and for prevention of camera shake.

Figure 3:
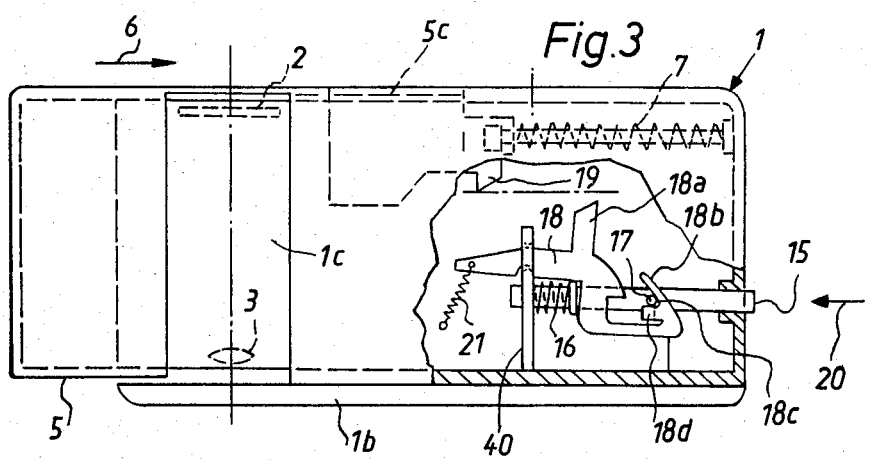
FIG. 3 is a partly elevational partly sectional view of a modified still camera.

FIG. 3 illustrates a portion of a slightly modified still camera. The construction and mounting of the reciprocable cover member 5 are identical with the construction and mounting of the cover member shown in FIG. 1. However, the detent mechanism of FIGS. 1 and 2 is replaced with a different detent mechanism which comprises a pivotable detent member 18 here shown as a leaf spring mounted in a bearing member 40 provided therefor in the body 1 of the camera housing. The leaf spring 18 is biased in a counterclockwise direction, as viewed in FIG. 3, by a relatively weak helical spring 21 which is secured to a post in the body of the camera housing. The cover member 5 has a detent member or tooth 19 which can bypass or engage a complementary projection or tooth 18a of the leaf spring 18. The leaf spring 18 is further provided with a cam 18b, a notch 18c which is located behind the cam 18b and a ramp or cam 18d having an inclined cam face (see FIG. 3e). The actuating means of the detent mechanism shown in FIG. 3 comprises a pushbutton or knob 15 which is depressible into the body 1 of the camera housing and is biased outwardly by a helical spring 16 reacting against the bearing member 40. The shank of the knob 15 carries a pin 17 which constitutes a follower for the cam 18b and can enter the notch 18c as well as slide along the ramp 18d.

Figure 3A:
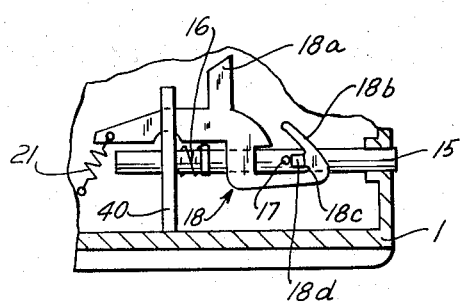
FIG. 3a illustrates a portion of the structure shown in FIG. 3 but with the parts of the detent mechanism in a different position.
Figure 3E:
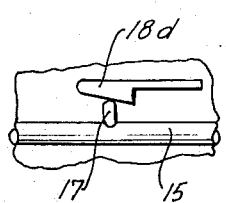
FIG. 3e is a view as seen in the direction of arrows from the line IIIe—IIIe of FIG. 3b.
Figure 3B:
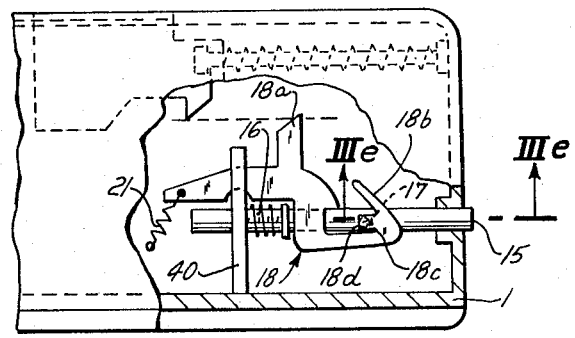
FIG. 3b shows the structure of FIG. 3a but with the parts of the detent mechanism in a further position.
Figure 3C:
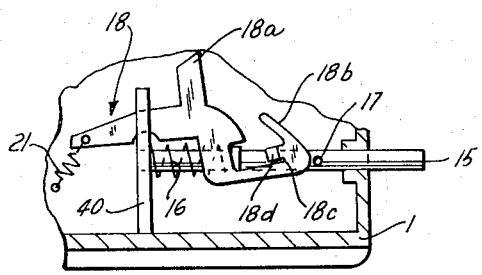
FIG. 3c shows the structure of FIG. 3a but with the parts of the detent mechanism in another position.

FIG. 3 illustrates the detent mechanism in its inoperative position. Thus, the operator of the camera can repeatedly depress the cover member 5 against the opposition of the spring 7 so as to automatically cock the shutter (not shown) and to automatically advance the film by the length of a frame, preferably in a manner as illustrated in FIG. 1. The tooth 19 of the cover member 5 bypasses the tooth 18a of the leaf spring 18 because the tooth 18a is held in the illustrated retracted position due to the fact that the follower 17 of the knob 15 extends into the notch 18c and thereby holds the leaf spring 18 against pivotal movement under the action of the spring 21. If the operator wishes to lock the cover member 5 in its first position, the cover member is moved in the direction indicated by the arrow 6 and the knob 15 is depressed (arrow 20) at the same time so that the follower 17 leaves the notch 18c of the leaf spring 18. The leaf spring 18 is then free to pivot under the action of the helical spring 21 so that the tooth 18a moves upwardly, as viewed in FIG. 3, and enters the path of movement of the tooth 19. This results in engagement of the teeth 18a and 19 as soon as the cover member 5 reaches its first position. The depressed position of the knob 15 is shown in FIG. 3a. If the operator thereupon relaxes or terminates the finger pressure upon the knob 15, the spring 16 expands and causes the follower 17 to slide along the ramp 18d (see FIG. 3b) so that the follower bypasses the corresponding part of the leaf spring 18 and comes to rest at the right-hand side of the cam 18b (see FIG. 3c).

Figure 3D:
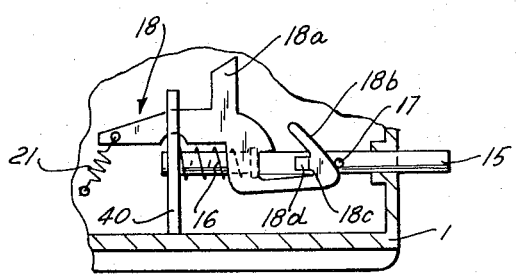
FIG. 3d shows the structure of FIG. 3a but with the parts of the detent mechanism in still another position.

If the user thereupon decides to make an exposure, the knob 15 is depressed in the direction indicated by the arrow 20 whereby the follower 17 engages the cam 18b and causes the leaf spring 18 to pivot clockwise against the opposition of the relatively weak helical spring 21. An intermediate position of the spring 18 is shown in FIG. 3d. This disengages the tooth 18a from the tooth 19 so that the cover member 5 can reassume the illustrated second position under the action of the spring 7. The spring 21 is free to contact as soon as the follower 17 bypasses the cam 18b whereby the leaf spring 18 pivots counterclockwise and moves the notch 18c to the position shown in FIG. 3 in which the notch receives the follower 17. The detent mechanism is then held in its inoperative position and can be actuated to return the tooth 18a back into the path of movement of the tooth 19 as soon as the operator again decides to depress the knob 15 in the direction indicated by arrow 20. The leaf spring 18 is mounted in the bearing member 40 with substantial freedom of movement so that it can be pivoted as well as tilted in the body 1. This enables the leaf spring 18 to pivot under the action of the spring 21 or against such action when the follower 17 engages the cam 18b, as well as to tilt when the follower 17 engages and travels along the ramp 18d.

An advantage of the detent mechanism of FIG. 3 is that the user can readily find the knob 15 without looking at the corresponding part of the body 1. Also, the knob 15 must be manipulated (depressed) in the same way when the user wishes to lock or unlock the cover member 5. This is in contrast to the manipulation of the knob 9 which must be shifted sideways in a first direction to initiate the locking and in a different second direction to initiate the unlocking of the cover member.

The knob 15 performs different functions during movement into and from the body 1. When the cover member is held in the first position by hand against the opposition of the spring 7, a depression of the knob 15 (arrow 20) results in counterclockwise pivoting of the leaf spring 18 under the action of the spring 21 and the return movement of knob 15 to its normal position (under the action of spring 16) results in tilting of the leaf spring 18 (while the follower 17 travels along the ramp 18d). If the knob 15 is depressed while the tooth 18a engages and holds the tooth 19, the follower 17 pivots the leaf spring 18 clockwise and the return movement of knob 15 to the illustrated position then results in entry of the follower 17 into the notch 18c.

The improved camera is susceptible of many additional modifications without departing from the spirit of the invention. Thus, the illustrated detent mechanisms can be replaced with simpler or more sophisticated detent mechanisms, for example, with a pushbutton which is mounted on the body 1 or cover member 5 and is depressible to enter a suitably configurated slot or opening in the cover member 5 or body 1, depending upon the mounting of the pushbutton. If desired, the cover member 5 can be dimensioned in such a way that it always overlies the view finder and/or the picture taking lens; the cover member is then provided with suitable cutouts or windows through which the optical elements 2, 3 and/or 4 can be seen when the cover member is caused to assume its second position. The cover member 5 can be further provided with one or more windows to expose various scales, dials, pointers or other indicating means which can be mounted in or on the body 1 of the camera housing. Still further, the cover member 5 can constitute a means for preventing double exposure of film frames. To this end, the cover member 5 can be provided with an extension, not shown, which prevents actuation of the camera release when the cover member 5 is caused to assume its first position, namely, when the spring 7 stores energy and the cover member conceals the optical elements 2, 3 and/or 4.

It is also possible to movably mount the tooth 12b or 19 on the cover member 5 and to fixedly mount the tooth 11c or 18a in the body 1; the knob 9 or 15 is then actuated to change the position of the tooth 12b or 19.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a photographic apparatus, particularly in a still camera, a combination comprising an elongated housing including a first section and a second section supported by and movable relative to said first section in the longitudinal direction of said housing between first and second positions in which one of said sections respectively conceals and exposes a portion of the other of said sections and in which the overall length of said housing is respectively reduced and increased; picture taking lens means and view finder means in said other section, at least one of said means being installed in said portion of said other section so that said one means is at least partially concealed in said first position of said second section; film transporting means mounted in one of said sections and being operable to transport the film in response to movement of said second section between said first and second positions thereof; resilient means reacting against said first section and arranged to bias said second section to said second position so that the movement of said second section to said first position takes place against the opposition of said resilient means and said resilient means at least assists the movement of said second section to said second position; detent means for said second section, said detent means having a member movable to an inoperative position in which said second section can be moved, as often as desired, relative to said first section between said first and second positions thereof, and said member of said detent means being further movable, in either position of said second section, to an operative position in which said second section is locked in said first position against movement from said first position under the action of said resilient means as long as said member of said detent means is located in said operative position while said second section assumes said first position thereof; and actuating means operable by hand to move said member of said detent means from said inoperative to said operative position or from said operative to said inoperative position, said actuating means having a first position of rest which corresponds to said operative position of said member of said detent means and from which said actuating means must be moved by hand in order to move said member of said detent means from said operative position, and said actuating means further having a second position of rest which corresponds to said inoperative position of said member of said detent means and from which said actuating means must be moved by hand in order to move said member of said detent means from said inoperative position.

2. A combination as defined in claim 1, wherein said film transporting means is operated in response to movement of said second section toward said first position thereof.

3. A combination as defined in claim 1, further comprising shutter means mounted in said first section and movable between cocked and uncocked positions, said second section comprising means for moving said shutter means to said cocked position in response to movement between said first and second positions.

4. A combination as defined in claim 1, wherein said second section is reciprocable between said first and second positions thereof.

5. A combination as defined in claim 1, wherein said actuating means is shiftable sideways between first and second positions of rest.

6. A combination as defined in claim 1, wherein said second section complements said first section in said second position thereof to impart to said housing a predetermined outline.

7. A combination as defined in claim 1, wherein said one section is said second section and said second section follows the outline of said portion of said first section when said second section assumes said first position.

8. A combination as defined in claim 1, wherein said member of said detent means is mounted in said first section and said detent means further comprises a second member mounted in said second section, said second member engaging said first mentioned member in said operative position of said first mentioned member and in response to movement of said second section to said first position, said first mentioned member being disengaged from said second member in response to movement of said first mentioned member to said inoperative position to thereby release said second section for movement between said first and second positions.

9. A combination as defined in claim 8, wherein said second member of said detent means comprises a first tooth and said first mentioned member of said detent means comprises a spring having a second tooth which engages and holds said first tooth in said first position of said second section and in said operative position of said first mentioned member.

10. A combination as defined in claim 8, wherein said first section has a projection and said first mentioned member of said detent means comprises an elastic portion which overlies said projection in said operative position of said first mentioned member.

11. A combination as defined in claim 8, wherein at least one of said members of said detent means consists of elastomeric material.

12. A combination as defined in claim 1, wherein said member of said detent means is pivotable between said operative and inoperative positions thereof.

13. In a photographic apparatus, particularly in a still camera, a combination comprising a housing including a first section and a second section supported by and movable relative to said first section between first and second positions in which one of said sections respectively conceals and exposes a portion of the other of said sections; resilient means reacting against said first section and arranged to bias said second section to said second position; and detent means actuatable to releasably hold said second section in said first position against the action of said resilient means, said detent means comprising a first detent member provided on said second section and a second detent member constituting a spring and provided on said first section, said second detent member being pivotable between an operative position in which said second detent member engages said first detent member in response to movement of said second section to said first position and an inoperative position in which said second detent member is disengaged from said first detent member to thus allow said resilient means to return said second section to said second position, said first detent member having a first tooth and said second detent member having a second tooth which engages and holds said first tooth in said first position of said second section and in said operative position of said second detent member, said detent means further comprising actuating means for pivoting said second detent member between said operative and inoperative positions, said actuating means comprising a pushbutton which is depressible in said first section to thereby effect pivotal movements of said second detent member between said operative and inoperative positions, said second detent member further comprising a cam and said pushbutton comprising a follower which is arranged to track said cam and to thereby pivot said second detent member from said operative position in response to depression of said pushbutton, said second detent member further having a notch which receives said follower in said inoperative position of said second detent member and in undepressed position of said pushbutton.

14. A combination as defined in claim 13, wherein said detent means further comprises means for pivoting said second detent member from said inoperative to said operative position thereof in response to depression of said pushbutton to thereby expel said follower from said notch, said second detent member having a ramp along which said follower travels back toward engagement with said cam in response to return movement of said pushbutton to undepressed position in the operative position of said second detent member.

* * * * *